(12) United States Patent
Larson et al.

(10) Patent No.: US 7,228,345 B2
(45) Date of Patent: Jun. 5, 2007

(54) SERVER WITH LAN SWITCH THAT CONNECTS PORTS BASED ON BOOT PROGRESS INFORMATION

(75) Inventors: Thane M. Larson, Roseville, CA (US); Loren Koehler, Fair Oaks, CA (US); Calvin B. Olsen, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 10/271,641

(22) Filed: Oct. 15, 2002

(65) Prior Publication Data

US 2004/0073637 A1 Apr. 15, 2004

(51) Int. Cl.
*G06F 15/177* (2006.01)

(52) U.S. Cl. ..................................... 709/222

(58) Field of Classification Search ................ 709/203, 709/224, 220, 222
See application file for complete search history.

(56) References Cited

U.S. PATENT DOCUMENTS

| | | | |
|---|---|---|---|
| 5,544,006 A | 8/1996 | Radloff et al. | |
| 5,809,262 A | 9/1998 | Potter | |
| 6,046,912 A | 4/2000 | Leman | |
| 6,058,011 A | 5/2000 | Hardt et al. | |
| 6,112,271 A | 8/2000 | Lanus et al. | |
| 6,129,591 A | 10/2000 | Czeschka | |
| 6,138,247 A | 10/2000 | McKay et al. | |
| 6,161,197 A | 12/2000 | Lanus et al. | |
| 6,162,073 A | 12/2000 | Haq et al. | |
| 6,166,902 A | 12/2000 | Liu | |
| 6,185,093 B1 | 2/2001 | Moss | |
| 6,185,110 B1 | 2/2001 | Liu | |
| 6,195,262 B1 | 2/2001 | Bodette et al. | |
| 6,198,633 B1 | 3/2001 | Lehman et al. | |
| 6,209,051 B1 | 3/2001 | Hill et al. | |
| 6,237,048 B1 | 5/2001 | Allen et al. | |
| 6,763,479 B1* | 7/2004 | Hebert | 714/4 |
| 6,875,110 B1* | 4/2005 | Crumby | 463/42 |
| 6,886,029 B1* | 4/2005 | Pecus et al. | 709/203 |
| 2002/0184349 A1* | 12/2002 | Manukyan | 709/221 |
| 2003/0101304 A1* | 5/2003 | King et al. | 710/301 |
| 2004/0236874 A1* | 11/2004 | Largman et al. | 710/8 |

OTHER PUBLICATIONS

PCT Industrial Computers Manufacturers Group (PCIMG); "CompactPCI Specification Short Form"; Sep. 2, 1997; 7 pgs.
Hewlett-Packard Company, Management and Configuration Guide, "HP ProCurve Switches 2512 and 2524"; Aug. 2000; 392 pgs.
Ziatech homepage: www.ziatech.com; Ziatech, an Intel Company, Leaders in CompactPCI Innovation; 2001; 2 pgs.

(Continued)

*Primary Examiner*—Jason Cardone
*Assistant Examiner*—Minh-Chau N. Nguyen (57) ABSTRACT

A server includes a processor, a memory, and a plurality of interfaces for outputting server status information. A LAN switch includes a first port configured to be coupled to a first LAN, a second port configured to be coupled to a second LAN, and a plurality of interface connection ports. Each interface connection port is configured to be coupled to one of the plurality of interfaces. The LAN switch is configured to selectively connect ports of the switch based on received boot progress information indicating a boot state of the server.

26 Claims, 5 Drawing Sheets

OTHER PUBLICATIONS

Broadcom; "BCM5382M Product Brief"; May 20, 2002; 2 pgs.
Broadcom; "BCM5380M Product Brief"; May 20, 2002; 2 pgs.
Cisco webpage: www.cisco.com/warp/public/473/lan-switch-cisco.shtml; "How LAN Switches Work"; Jul. 17, 2002; 15 pgs.

* cited by examiner

| "OUTPUT" PORT | 150D | | | | 150E | | | |
|---|---|---|---|---|---|---|---|---|
| "INPUT" PORT | 150A | 150B | 150C | X | 150A | 150B | 150C | X |
| BIT # | 7 | 6 | 5 | 4 | 3 | 2 | 1 | 0 |

Fig. 5 even if firewalls are used. Unauthorized access by an application user to chassis management functions could lead to permanent data corruption for all users. Similarly, unauthorized access by a chassis administrator to an application could lead to a compromise of secure data.

SERVER WITH LAN SWITCH THAT CONNECTS PORTS BASED ON BOOT PROGRESS INFORMATION

THE FIELD OF THE INVENTION

The present invention generally relates to servers, and more particularly to a server with a local area network (LAN) switch that connects ports based on boot progress information.

BACKGROUND OF THE INVENTION

Management (console) communications are used in server systems to send and receive status, control and configuration information. Management communications are typically transmitted and received via a single local area network (LAN) interface (i.e., a LAN that combines management and payload communications), or via a cable to an RS-232 port on the server.

When there is no management LAN, each server typically includes an RS-232 port for management communications. When a large number of servers are to be controlled, a complex, hard-to-manage wiring bundle to each individual server's RS-232 port is typically implemented, which connects each individual server with a complex set of switch networks. Using an RS-232 port for management communications is sufficient for a single stand-alone server, but when the server is integrated with many others, a separate cable for each server is difficult to maintain and configure.

As an alternative to dedicated RS232 ports, some servers will use a LAN interface commonly implemented as a Network Interface Card (NIC) configured and maintained through the operating system. Normally this LAN is used for application and customer payload information, and the management functions are an add-on.

If a single LAN interface is used, there is a security hole in that management information commingles with payload information on a single LAN. This commingling of signals on a single LAN allows for unauthorized snooping, and the potential for unauthorized communications to console devices. For a single LAN interface, a security driven software layer can be used (at additional cost), but there is a possibility that the security layer could be compromised. The mixed data stream is vulnerable to security breaches even if firewalls are used. Unauthorized access by an application user to chassis management functions could lead to permanent data corruption for all users. Similarly, unauthorized access by a chassis administrator to an application could lead to a compromise of secure data.

With the single LAN solution, the content on the LAN can be segregated outside of the system to the two different streams, management and payload. This forces the same solution on all systems in a data center. A system-by-system solution is difficult, to obtain and maintain. In addition, by having the segregation in commercial, sometimes publicly accessible switches, the possibility of hacking is greatly increased. Once the LANs are linked through an external switch, management or information technology (IT) personnel would typically configure the system, and then hand it over to the application users/developers, who would typically change passwords for security reasons to lock out the IT personnel from the system. Only through manual intervention and coordination between the two types of users can full manageability be obtained.

It would be desirable to provide a server with a more convenient, flexible, and secure system for management communications.

SUMMARY OF THE INVENTION

One form of the present invention provides a server including a processor, a memory, and a plurality of interfaces for outputting server status information. A LAN switch includes a first port configured to be coupled to a first LAN, a second port configured to be coupled to a second LAN, and a plurality of interface connection ports. Each interface connection port is configured to be coupled to one of the plurality of interfaces. The LAN switch is configured to selectively connect ports of the switch based on received boot progress information indicating a boot state of the server.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
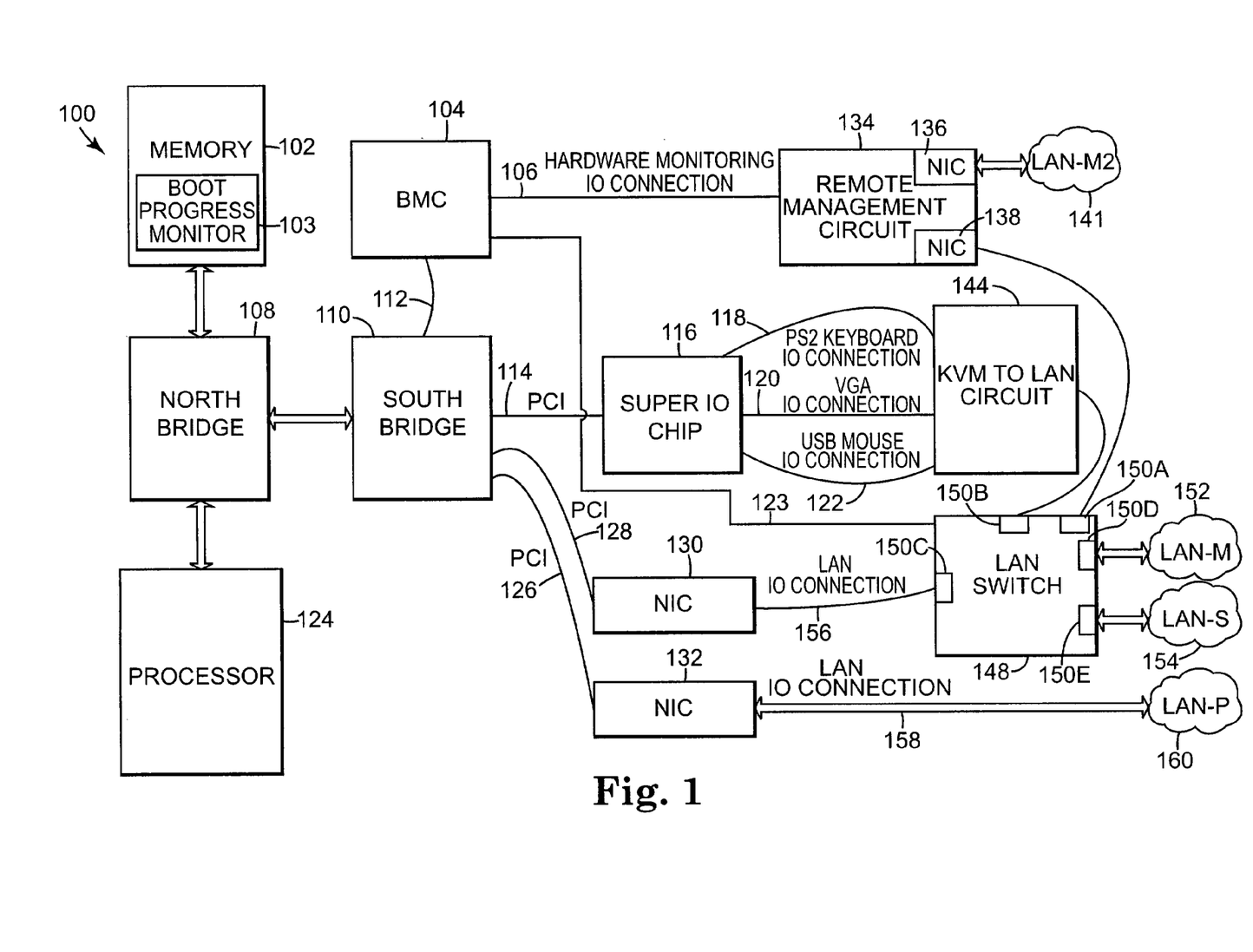
FIG. 1 is an electrical block diagram illustrating major components of a server with a LAN switch according to one embodiment of the present invention.

FIG. 1 is an electrical block diagram of a server 100 with a local area network (LAN) switch 148 according to one embodiment of the present invention. Server 100 includes memory 102, base management controller (BMC) 104, remote management circuit 134, north bridge 108, south bridge 110, super I/O chip 116, Keyboard-Video-Mouse (KVM) to LAN circuit 144, processor 124, network interface cards (NICs) 130 and 132, and LAN switch 148. In one embodiment, the components of server 100 are all commercially available and custom circuitry is not used.

In one embodiment of the present invention, server 100 is a server blade for a bladed server system, such as Hewlett Packard's bh7800 bladed system. In a bladed system, different types of system cards (blades) are inserted into a common chassis. A back-plane provides connectivity, and power and cooling is shared by the blades. This approach typically allows denser systems to be built than is possible with racks of conventional servers. Blades that might be included in a bladed server system include a server management card (SMC) blade, one or more network blades, server blades, and storage blades. Information describing bladed server systems offered by Hewlett-Packard is available on Hewlett-Packard's website at http://www.hp.com. Although embodiments of the present invention are described in the context of a bladed server system, the techniques described herein are also applicable to other types of server systems, as will be understood by persons of ordinary skill in the art. For example, embodiments of the present invention provide benefits to any dense server deployment, such as a rack of 1U stand-alone servers.

As shown in FIG. 1, server 100 is configured to be coupled to four LANs 141, 152, 154, and 160. In one embodiment, backup management LAN (LAN-M2) 141 and primary management LAN (LAN-M) 152 are configured to be accessible to a first set of authorized users, referred to herein as information technology (IT) users, and primary payload LAN (LAN-P) 160 and secondary payload and management LAN (LAN-S) 154 are configured to be accessible to a second set of authorized users, referred to herein as application users. In general, the IT users do not have access to LANs 154 and 160, and the application users do not have access to LANs 141 and 152.

In one embodiment, primary payload LAN 160 is configured for payload content (e.g., application content) communications; LAN 154 is configured for payload (e.g., redundant application content) and management content communications; and management LANs 141 and 152 are configured for management content communications.

For security purposes, physically separate LANs could be provided, with one set of LANs dedicated solely to payload content, and a second set of LANs dedicated solely to management content. Although providing physically separate LANs helps eliminate security problems, this solution does not deal with the conflicting interest of having some management content available to both the application and the management (IT) sides. The completely segregated solution does not address the situation where management content might be needed by the application side of the solution.

Management content typically includes system/infrastructure level management content and application/operating system level management content. System/infrastructure level management content includes information and applications such as infrastructure user consoles, hardware resets, hardware alert messaging, chassis-level password management, firmware upgrades, and chassis-level security management. These types of system-level operations should not be generally available to a software developer or a general-purpose application user in a server system that can host many systems, users, and even competitors with the same infrastructure. However, there is a subset of management content (i.e., application/operating system level management content) that may be needed by an application user or developer, such as local user consoles, software resets, OS and application alert messaging, user password management OS and software upgrades, and application security management.

These two types of management content can be separated and put out on two segregated LANs (e.g., application/operating system level management content on secondary payload and management LAN 154, and system/infrastructure level management content on primary management LAN 152). However, the management (IT) side of the solution would then be shielded from application/operating system level management content, and only system level management would be available on the management LAN 152 unless expensive and custom hardware were used.

One embodiment of the present invention addresses the concerns of keeping payload content secure from unauthorized access by IT users, while providing a flexible solution for securely routing appropriate management content to both the application users and IT users.

Referring again to FIG. 1, memory 102 stores application program instructions, data, an operating system (OS), and a boot progress monitor 103. The operating system controls the processor 124 and the memory 102 for system operations and for executing the application program instructions. In one embodiment, boot progress monitor 103 monitors and reports the boot progress or boot states (e.g., power-on, BIOS boot, DOS boot, OS boot, application launch, etc.) of server 100, as described in further detail below. In one embodiment, boot progress monitor 103 is implemented in read-only memory (ROM) as part of the BIOS (Basic Input/Output System). In another embodiment, boot progress monitor 103 is implemented in firmware (e.g., for non-Wintel (Windows/Intel) architectures).

Processor 124 and memory 102 are coupled together via north bridge 108. North bridge 108 is also coupled to south bridge 110. Super I/O chip 116 is coupled to south bridge 110 via peripheral component interconnect (PCI) link 114. The north/south bridge architecture with a super I/O chip shown in FIG. 1 is a common architecture that is known to those of ordinary skill in the art.

Base management controller (BMC) 104 is coupled to south bridge 110 via interface 112. In one embodiment, interface 112 is an Intelligent Platform Management Interface (IPMI). The IPMI specification is a standard defining an abstracted interface to platform management hardware. BMC 104 is also coupled to remote management circuit 134 via hardware monitoring I/O connection 106. BMC 104 monitors hardware events that are communicated across interface 112 (e.g., chip failures, disk drive failures, fan sensor information, voltage sensor information, temperature sensor information, etc.), and reports these events to remote management circuit 134. Remote management circuit 134 includes network interface cards (NICs) 136 and 138. Network interface card 136 is coupled to backup management LAN 141. Network interface card 138 is coupled to port 150A of LAN switch 148. BMC 104 and remote management circuit 134 provide a mechanism of hardware control and monitoring of circuitry in server 100. In one embodiment, remote management circuit 134 provides a LAN-based console access to the server 100 that does not depend on the state of the operating system of the server 100.

BMC 104 is also coupled to LAN switch 148 via communication link 123. In one embodiment, communication link 123 represents a connection between BMC 104 and general-purpose input/output (GPIO) pins of switch 148. In an alternative embodiment, communication link 123 is an inter-IC ($I^2C$) bus. Communication link 123 provides a communication path for transmitting server boot progress or boot state information (determined by boot progress monitor 103) to LAN switch 148. In alternative embodiments, other techniques may be used for communicating boot information to LAN switch 148.

The connections between super I/O chip 116 and KVM to LAN circuit 144 include a PS2 keyboard I/O connection 118, a Video Graphics Array (VGA) I/O connection 120, and a Universal Serial Bus (USB) mouse I/O connection 122. KVM to LAN circuit 144 receives keyboard, video, and mouse data (KVM data) from super I/O chip 116 and translates the data into an appropriate coding structure for transmission over a LAN in a conventional manner known to those of ordinary skill in the art. A client computer can then receive the KVM data and view a "snapshot" of what the screen looks like on the server 100 that transmitted the KVM data. Because the KVM data provides a snapshot of what the server screen looks like, the KVM data should be treated as sensitive data.

Network interface cards 130 and 132 are coupled to south bridge 110 via PCI links 128 and 126, respectively. Network interface card 130 is coupled to port 150C of LAN switch 148 via LAN I/O connection 156. Network interface card 132 is coupled to primary payload LAN 160 via LAN I/O connection 158. In one embodiment, server 100 sends application/operating system level management content and other application/operating system data through NIC 130 to LAN switch 148. In one form of the invention, such application/operating system level information includes alerts indicating software failures, and information indicating whether the operating system is up or down, and panics and shutdowns. In one embodiment, payload content is transmitted between NIC 132 and primary payload LAN 160 without going through LAN switch 148.

LAN switch 148 includes ports 150A-150E (collectively referred to as ports 150). For convenience in describing the operation of LAN switch 148, ports 150A, 150B, and 150C, may be considered "input" ports, and ports 150D and 150E may be considered "output" ports, although all of the ports 150 are bi-directional ports in one embodiment. Because of the three "input" ports and the two "output" ports, five-port switch 148 is also referred to as a three-to-two switch. Ports 150D and 150E are coupled to primary management LAN 152 and secondary payload and management LAN 154, respectively.

In one embodiment, the data through port 150A is management content, the data through port 150B is a combination of payload content and management content, and the data through port 150C is a combination of payload content and management content. In one embodiment, the data through port 150D is management content, and the data through port 150E is a combination of payload content and management content. In one form of the invention, connections between select input ports 150A-150C and output ports 150D-150E are dynamically configured based on boot progress or boot state information determined by boot progress monitor 103 and output to LAN switch 148 via communication link 123, thereby causing appropriate management content to be routed to LANs 152 and 154, while maintaining the security of the payload content, as described in further detail below with reference to FIGS. 2 and 3. In another embodiment, connections between select input ports 150A-150C and output ports 150D-150E may also be configured from primary management LAN 152 and secondary payload and management LAN 154 through ports 150D and 150E, respectively.

Figure 2:
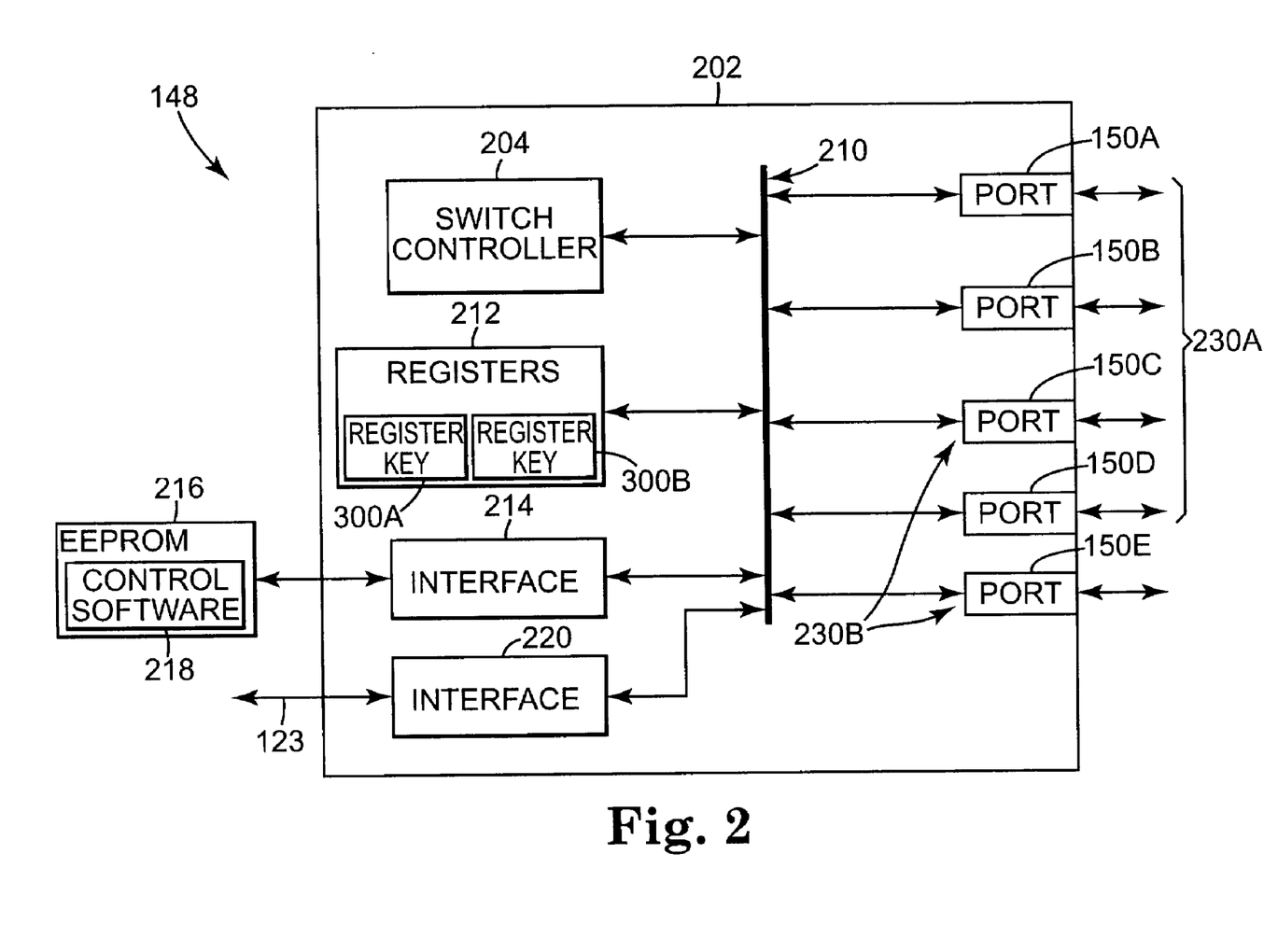
FIG. 2 is an electrical block diagram illustrating the LAN switch shown in FIG. 1 in additional detail according to one embodiment of the present invention.

FIG. 2 is an electrical block diagram illustrating the LAN switch 148 shown in FIG. 1 in additional detail according to one embodiment of the present invention. LAN switch 148 includes switch integrated circuit (switch IC) 202 and electrically erasable programmable read only memory (EEPROM) 216. Switch IC 202 includes switch controller 204, ports 150A-150E, registers 212, and I/O interfaces 214 and 220, which are communicatively coupled together via communication link 210. In one embodiment, switch IC 202 is an off-the-shelf integrated circuit, such as a BCM5325, BCM5382, or BCM5380M, which are Broadcom Corporation products. Alternative embodiments may use other switch circuits offered by other vendors, or custom switch circuits.

EEPROM 216 is coupled to switch IC 202 via I/O interface 214. In one embodiment, control software 218 for controlling switch IC 202 is stored in EEPROM 216. In an alternative embodiment, switch IC 202 includes on-board storage for storing control software and/or firmware.

In one embodiment, LAN switch 148 is configured to use port-based virtual local area networks (VLANs). In one embodiment, two default virtual LANs 230A and 230B with different subnets are set up within LAN switch 148. As shown in FIG. 2, a first VLAN 230A includes ports 150A, 150B, 150C, and 150D, and a second VLAN 230B includes ports 150C and 150E. In one embodiment, a user logged into VLAN 230A would not have any visibility into VLAN 230B, and a user logged into VLAN 230B would not have any visibility into VLAN 230A.

As shown in FIG. 2, registers 212 include two programmable registers or "register keys" 300A and 300B (collectively referred to as register keys 300). In one embodiment, VLANs 230A and 230B may be reconfigured by modifying the contents of the register keys 300.

Figure 3:
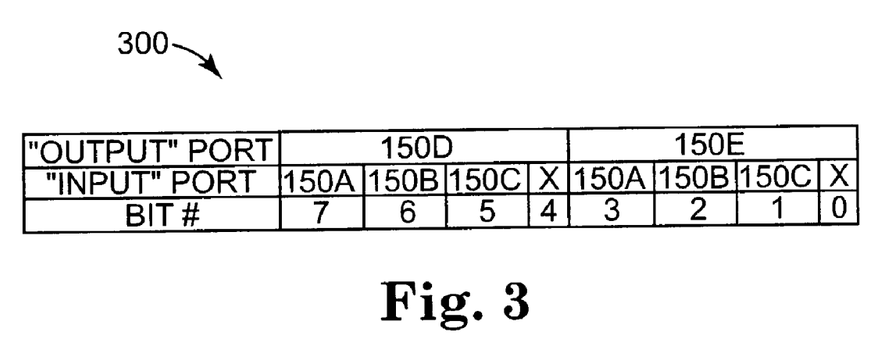
FIG. 3 is a diagram of a table illustrating the format of register keys according to one embodiment of the present invention.

FIG. 3 is a diagram illustrating the format of one of the register keys 300 according to one embodiment of the present invention. In one form of the invention, both register keys 300A and 300B have the same format (shown in FIG. 3). In one embodiment, the content of register keys 300 determines what connectivity is allowed between the input ports 150A-150C and the output ports 150D-150E of switch 148. In one embodiment, LAN switch 148 has an Internet Protocol (IP) address associated with it and allows configuration changes to be made based on server boot progress or boot state information received through interface 220. In one form of the invention, the contents of both register keys 300 are modified based on the received boot progress information.

In another embodiment, LAN switch 148 also allows configuration changes to be made through the output ports 150D-150E. In one form of the invention, register key 300A can be changed through port 150D (but not through the other ports 150), and register key 300B can be changed through port 150E (but not through the other ports 150). In one embodiment, connection or configuration information is sent from management LAN 152 to port 150D to change the contents of register key 300A as desired, and connection or configuration information is sent from secondary payload and management LAN 154 to port 150E to change the contents of register key 300B as desired.

As shown in FIG. 3, each register key 300 includes eight bits, numbered 0-7. An "x" is placed in bit positions 0 and 4, where x indicates that these bits are reserved for a future additional port. Bits 1-3 are used to indicate the permissibility of a connection between output port 150E and input ports 150C, 150B, and 150C, respectively. Bits 5-7 are used to indicate the permissibility of a connection between output port 150D and input ports 150C, 150B, and 150A, respectively.

In one form of the invention, the register keys 300 are used by switch controller 204 to determine if communication is allowed between particular input ports 150A-150C and output ports 150D-150E. For example, a one in bit 7 indicates that a link is allowed between port 150A and port 150D; and a zero in bit 2 indicates that a link is disallowed between port 150B and port 150E.

In one embodiment, the logical AND of the two register keys 300 is performed by switch controller 204 to establish the connectivity. For example, suppose the first register key 300A is set to: 1110 0010; and the second register key 300B is set to: 1000 1110; then the logical AND of the two register keys 300 is: 1000 0010 (i.e., only bits 7 and 1 are set). Thus, the resultant connections allowed by the LAN switch 148 are ports 150A-to-150D and 150C-to-150E.

In one form of the invention, registers 300 are programmed based on server boot progress or boot state information received from boot progress monitor 103 through interface 220. In one embodiment, six different boot states are reported to LAN switch 148 through interface 220: (1) System Power Off, Management Off; (2) System Power Off, Management On; (3) System Powered on-Pre boot; (4) Early boot (BIOS/Firmware boot); (5) Operating System (OS) boot; and (6) OS up, application launch. In one embodiment, the current server boot state is represented by a four-bit boot state identifier, which is sent to LAN switch 148 via communication link 123.

In one form of the invention, as server 100 transitions from one boot state to the next, boot progress monitor 103 sends a boot state identifier to LAN switch 148 to identify the new boot state. In one embodiment, interface 220 includes a logic circuit for determining the bits that will be set in register keys 300 for each of the different boot state identifiers. For example, the logic circuit may be configured to assert bit number 7 in both register keys 300A and 300B if the boot state identifier indicates that the current boot state is state number one, OR state number 2, OR state number 3. Thus, bit number 7 in both register keys 300 would be set to one for the first three states set forth above, and would be set to zero for the last three states. Alternative embodiments may use other methods of programming the register keys 300 based on received boot progress information.

In one embodiment, switch controller 204 configures VLANs 230A and 230B based on the contents of register keys 300. VLANs 230A and 230B are dynamically configured to change the privileges of ports 150D and 150E based on the boot progress state of server 100. For example, the early boot states (e.g., booting BIOS and switching into the OS boot) should typically be accessible to IT users. However, once the OS is up and the application is launched, IT users should not typically have access to customer sensitive data available on ports 150B and 150C of the switch 148. In one embodiment, system 100 provides transitions in the type of data that can be observed by different classes of users, namely IT users and application users, based on boot states of the system.

Through the boot process, there may be certain information that is appropriate for both application users on LAN 154 and IT users on LAN 152. While the operating system is booting up, IT users may want access to the operating system (through port 150C) to make sure that it is configured correctly and is booting up appropriately. However, after the OS is booted up, it may be inappropriate for IT users to still have access to the OS, since that is the time that application users launch applications. By dynamically configuring VLANs 230A and 230B based on the boot progress of server 100, information from input ports 150A-150C can be routed to the appropriate output ports 150D-150E without compromising security.

As another example, in one embodiment the KVM data on input port 150B of switch 148 provides an unedited view of what the screen (VGA terminal) would present to a user. When the system 100 is in the early boot process and BIOS parameters can be reconfigured (including IT system administration passwords), application users should not typically have access to the system. Conversely, when a user application is running on system 100, such as a bank database, IT users should not typically have access to the system during these transactions. Thus, automatically steering the KVM data on port 150B through the switch 148 and out to LAN 152 (through port 150D) during early boot, and then later to LAN 154 (through port 150E) when the application is running, provides a high level of manageability without compromising the security of the system.

Figure 4:
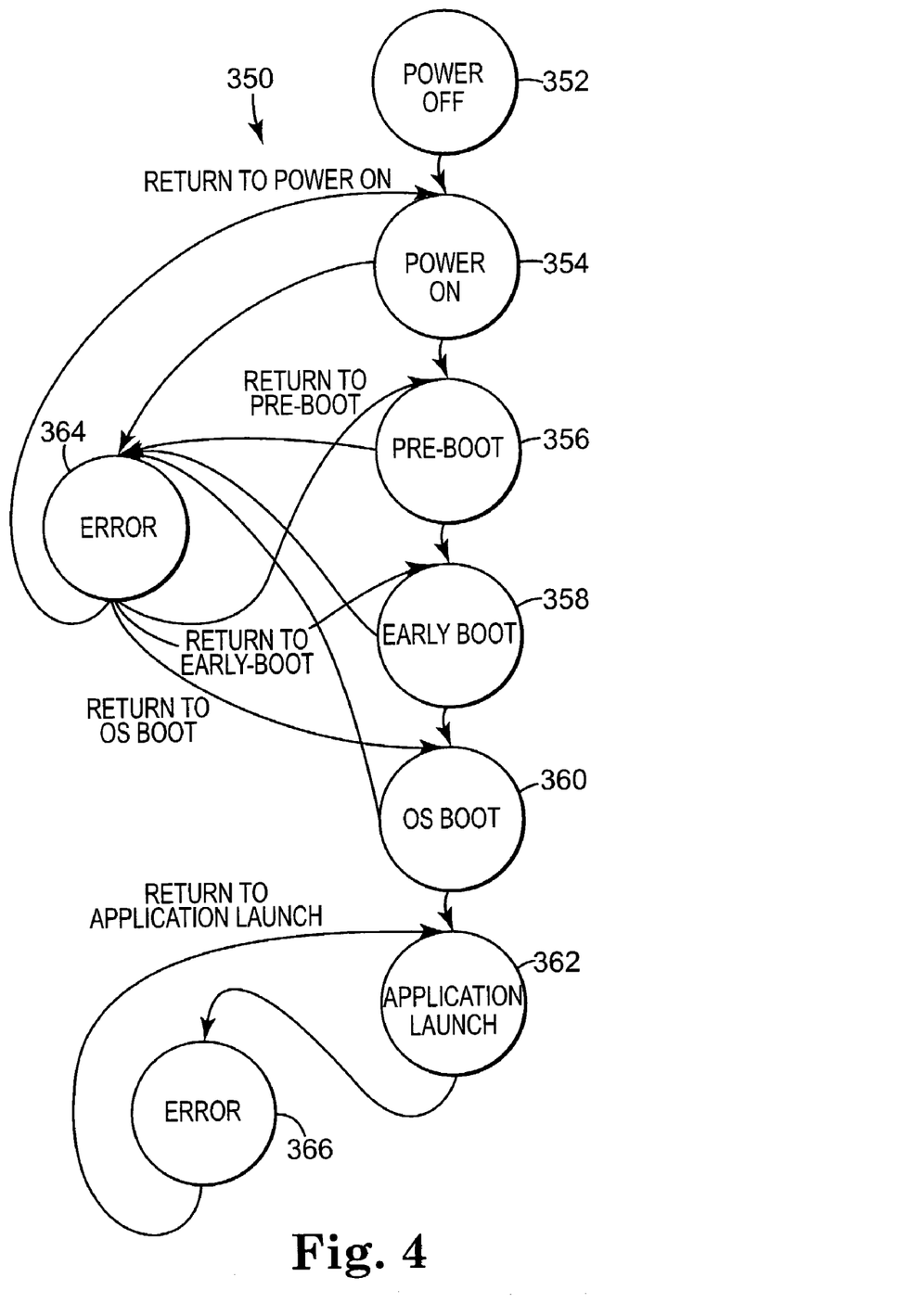
FIG. 4 is a flow diagram illustrating boot progress states reported to the LAN switch according to one embodiment of the present invention.

FIG. 4 is a flow diagram 350 illustrating boot progress states of server 100 that are reported to LAN switch 148 according to one embodiment of the present invention. As shown in FIG. 4, server 100 begins in power off state 352. In state 352 according to one embodiment, system power is off, management circuitry power (e.g., power to remote management circuit 134) is off, and power to LAN switch 148 is off, and there is no communication with LANs 152 and 154.

Server 100 transitions from power off state 352 to power on state 354. In state 354 according to one embodiment, system power remains off, management circuitry and LAN switch 148 are powered on, and register keys 300 are programmed to connect input ports 150A and 150B to output port 150D, and to disable port 150E. If an error occurs during power on state 354, the process jumps to error state 364. A new register key configuration may be programmed during error state 364 to change the connectivity of LAN switch 148. After the error is addressed during error state 364, the process returns to power on state 354 to complete the power on sequence.

After power on state 354, server 100 transitions to pre-boot state 356. In state 356 according to one embodiment, system power is turned on, input ports 150A and 150B remain connected to output port 150D, and output port 150E remains disabled. In one form the invention, hardware monitoring and integrity checks are performed on server 100 via LAN 152 during pre-boot state 356. If an error occurs during pre-boot state 356, the process jumps to error state 364. A new register key configuration may be programmed during error state 364 to change the connectivity of LAN switch 148. After the error is addressed during error state 364, the process returns to pre-boot state 356 to complete the pre-boot sequence.

During early boot state 358 according to one embodiment, the BIOS or firmware of server 100 boots up, and input ports 150A-150C are each connected to both output ports 150D and 150E. If an error occurs during early boot state 358, the process jumps to error state 364. A new register key configuration may be programmed during error state 364 to change the connectivity of LAN switch 148. After the error is addressed during error state 364, the process returns to early boot state 358 to complete the early boot sequence.

After the early boot state 358, server 100 transitions to OS boot state 360. In state 360 according to one embodiment, the operating system of server 100 boots up and input ports 150A-150C each remain connected to both output ports 150D and 150E. If an error occurs during OS boot state 360, the process jumps to error state 364. A new register key configuration may be programmed during error state 364 to change the connectivity of LAN switch 148. After the error is addressed during error state 364, the process returns to OS boot state 360 to complete the OS boot sequence.

Server 100 transitions from OS boot state 360 to application launch state 362. In state 362 according to one embodiment, the operating system has booted up, one or more applications are launched, input port 150A is connected to output port 150D, and input ports 150B and 150C are connected to output port 150E. If an error occurs during application launch state 362, the process jumps to error state 366. In one embodiment, the register key configuration is programmed during error state 366 to cause input ports 150A and 150B to be connected to output port 150D, and input ports 150B and 150C to remain connected to output port 150E. After the error is addressed during error state 366, the process returns to application launch state 362 to complete the application launch sequence.

As mentioned above, in addition to programming LAN switch 148 based on boot progress information received through interface 220, one embodiment also allows LAN switch 148 to be programmed through ports 150D and 150E. One embodiment of the present invention allows for either output port 150D or 150E to disconnect the other, and connections can be established if both ports 150D and 150E agree to make the connections. Thus, in one form of the invention, with the register keys 300, either a superuser on management LAN 152 or a superuser on secondary payload and management LAN 154 can cut connections, but cooperation is required in one embodiment to open the connections through ports 150D and 150E. Because of these abilities, the control software 218 for the LAN switch 148 should have a good security policy for accessing the register keys 300.

In one embodiment, in order to return the switch 148 to a useable state in the event of initial deployment or a catastrophic error, a hardware jumper is supplied to the switch 148, which sets both register keys' settings to: 1110 0010.

Typically, VLANs are setup in a LAN switch by logging into the switch as a superuser, and setting up the desired VLAN configurations. However, with the two register keys 300 used in one embodiment of the present invention, the superuser coming in on port 150D has essentially been limited to a single key 300A, and the same is true for the superuser coming in on port 150E. The combination or comparison of these independent keys 300 determines the configuration of the overall port-based VLANs. In one embodiment, LAN switch 148 is restricted from allowing ports 150D and 150E to communicate, so these two ports will not be on the same VLAN.

Typically, the information from the remote management circuit 134 would only go out on port 150D to management LAN 152, and be used by IT users. However, some application users running applications on LAN 154 may want to have more control of the infrastructure, and may require access to the remote management circuit 134. For such users, the LAN switch 148 can be configured through the two ports 150D and 150E as described above to allow connectivity between ports 150A and 150E.

In addition, the following are some other possible scenarios and the connections and disconnections between ports 150 in switch 148 that might be configured for these scenarios. During initial installation of server 100, an IT user on management LAN 152 may need full access to ports 150A-150C, so port 150D is connected to ports 150A-150C. If a secure application is running on server 100, an application user on LAN 154 may need full access to ports 150B and 150C, and an IT user on management LAN 152 may need access to port 150A, so port 150E is connected to ports 150B and 150C, and port 150D is connected to port 150A. If a customer on LAN 154 fails to pay its bill, a user on management LAN 152 can cut off access of LAN 154 to ports 150B and 150C by closing these connections as described above. If a customer on LAN 154 discovers a security breach, the customer may cut off all connections between ports 150 except the connection between ports 150E and 150C. If an IT user on management LAN 152 discovers a security breach, the IT user may cut off all connections between ports 150 except the connection between ports 150D and 150A. If a user on LAN 154 has a failure and needs IT support, access to ports 150A-150C through the management LAN 152 may be opened by connecting port 150D to ports 150A-150C.

The design of the register-key structure according to one embodiment provides flexibility in allowing virtually any VLAN combination to be programmed, which allows the different needs of IT users and application users to be satisfied, while maintaining security of the content on the LANs.

Figure 5:
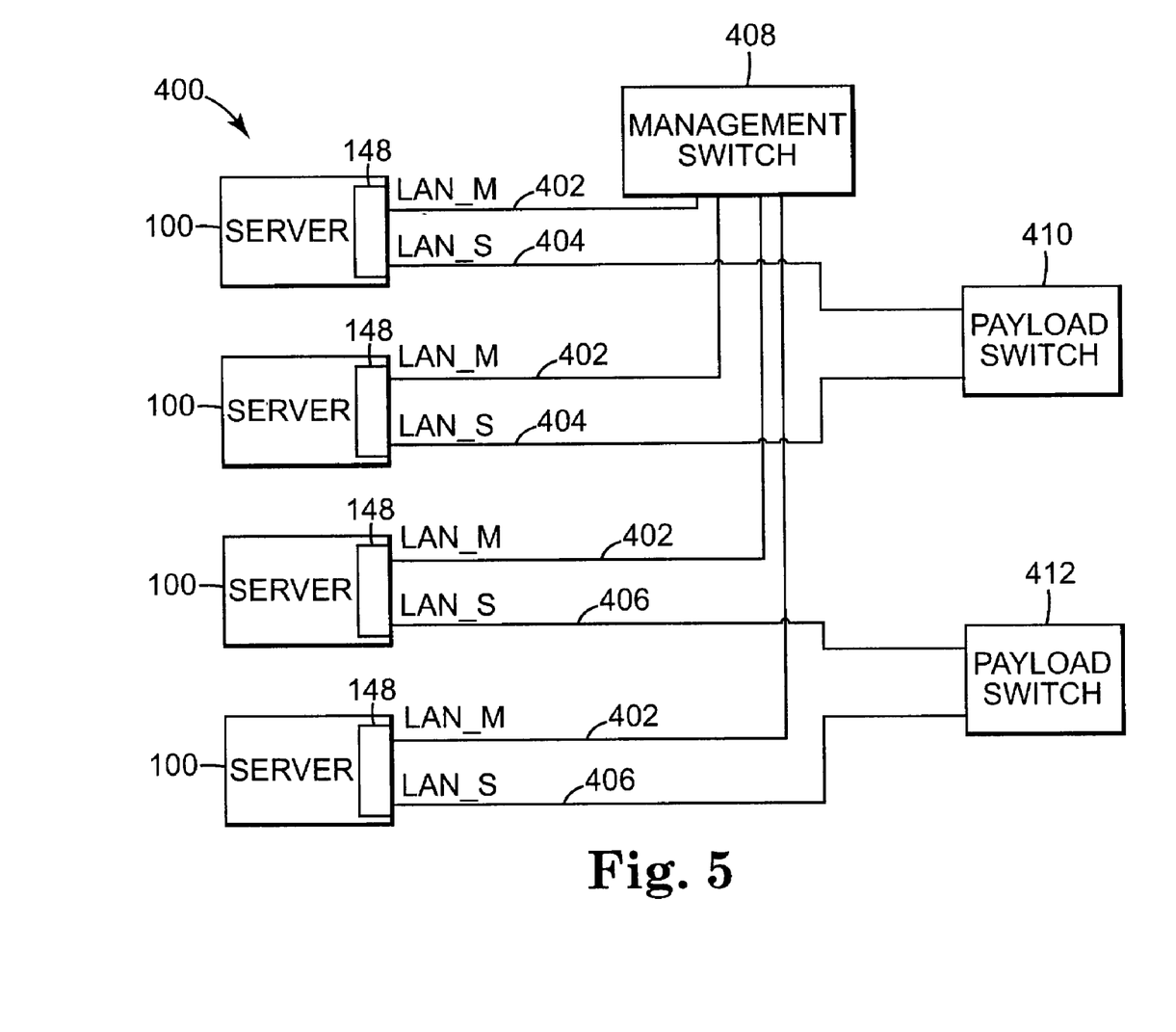
FIG. 5 is a block diagram illustrating major components of a server system according to one embodiment of the present invention.

FIG. 5 is a block diagram illustrating a server system 400 according to one embodiment of the present invention. Server system 400 includes a plurality of servers 100 (shown in FIG. 1), a management LAN switch 408, and two payload LAN switches 410 and 412. Each server 100 includes a LAN switch 148 (shown in FIGS. 1 and 2). In one embodiment, server system 400 is a bladed server system, and each server 100 is a blade in the system. In another embodiment, system 400 represents a rack of server boxes, and each server 100 represents a single server box in the rack.

Port 150D of the LAN switch 148 for each server 100 in system 400 is connected to management switch 408 via communication links 402. Port 150E of the LAN switch 148 for the top two servers 100 in FIG. 5 are connected to payload LAN switch 410 via communication links 404. Port 150E of the LAN switch 148 for the bottom two servers 100 in FIG. 5 are connected to payload LAN switch 412 via communication links 406. Management switch 408 provides an interface between the communication links 402 of the servers 100 and one or more management LANs 152 (shown in FIG. 1). Payload switches 410 and 412 provide an interface between the communication links 404 and 406 of the servers 100 and one or more secondary payload and management LANs 154 (shown in FIG. 1).

In one embodiment, management switch 408 is implemented on a blade in system 400, such as on a server management card. In another embodiment, management switch 408 is implemented as a standalone switch. Similarly, payload LAN switches 410 and 412 are implemented as LAN switch blades in one embodiment, and standalone switches in another embodiment.

To simplify the illustration, the communication links from servers 100 for the secondary management LAN 141 and the primary payload LAN 160 are not shown in FIG. 5. There are several different conventional methods to route these signals from the servers 100 to the appropriate LANs, which will be known to those of ordinary skill in the art.

One embodiment of the present invention provides a server 100 with an on-board switch 148 that provides full management access to the server operating system, KVM control, and system management (e.g., the remote management circuit 134). In one form of the invention, with the integrated switch 148, using custom control software/firmware 218 and VLAN capability, security is maintained and flexibility of configurations is provided. One embodiment provides a server that is configured to selectively aggregate services onto segregated external LANs. In addition, in one embodiment, all console types are supported over either of the two LAN connections 152 or 154, thus allowing an optimal remote management solution.

In one embodiment, LAN switch 148 dynamically changes access to management data based on boot state information communicated to the switch 148. In addition to providing physical security, implementing a boot progress monitor 103 as BIOS/firmware extensions as is done in one embodiment allows for the decision process of security to be located in a secure part of the architecture. Additionally, by having dynamic privileges according to one form of the invention, the manageability of the system can be increased without compromising the security of the system. Through BIOS/firmware extensions and dynamic VLAN configuration according to one form of the invention, the conflicting needs of IT management and application management can be resolved.

In one form of the invention, higher-level management software such as Openview Network Node Manager, Tivoli, TopTools, etc. can fault-manage a server blade 100 in a bladed server system, as well as the chassis through a single management LAN connection 152. Alternatively, the application user can gain access to a customizable, limited set of management tools that can be controlled dynamically by IT support from the management LAN 152.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A server comprising:
   a processor;
   a memory;
   a plurality of interfaces for outputting server status information;
   a LAN switch including a first port configured to be coupled to a first LAN, a second port configured to be coupled to a second LAN, and a plurality of interface connection ports, each interface connection port configured to be coupled to one of the plurality of interfaces; and
   wherein the LAN switch is configured to selectively connect ports of the switch based on received boot progress information indicating a boot state of the server.

2. The server of claim 1, wherein the plurality of interfaces include a first interface for outputting hardware status information to a first one of the interface connection ports, and a second interface for outputting operating system status information to a second one of the interface connection ports.

3. The server of claim 2, wherein the plurality of interfaces include a third interface for outputting keyboard-video-mouse (KVM) data to a third one of the interface connection ports.

4. The server of claim 1, and further comprising a boot progress monitor for monitoring boot states of the server and sending boot progress information to the LAN switch.

5. The server of claim 1, wherein the first LAN is a management LAN, and the second LAN is a payload and management LAN.

6. The server of claim 1, wherein the LAN switch includes at least one register that is programmable based on the received boot progress information, and wherein the content of the at least one register identifies allowable connections between the ports of the LAN switch.

7. The server of claim 1, wherein the server is configured as a blade for a bladed server system.

8. The server of claim 1, wherein the server is configured as a stand-alone server.

9. The server of claim 1, wherein at least one virtual LAN (VLAN) is configured in the LAN switch based on the received boot progress information.

10. A method of selectively routing information from a server to a plurality of LANs, the method comprising:
    providing a LAN switch having ports connected to server interfaces of the server and to the plurality of LANs;
    generating switch configuration information based on a current boot state of the server; and
    connecting ports of the LAN switch based on the configuration information.

11. The method of claim 10, wherein the server interfaces include a first interface for outputting hardware status information and a second interface for outputting operating system status information.

12. The method of claim 11, wherein the server interfaces include a third interface for outputting keyboard-video-mouse (KVM) data.

13. The method of claim 10, wherein the plurality of LANs include a management LAN and a payload and management LAN.

14. The method of claim 10, and further comprising:
    programming at least one register in the LAN switch based on the configuration information; and
    identifying allowable connections between ports of the LAN switch based on the contents of the at least one register.

15. The method of claim 10, wherein the server is implemented as a server blade for a bladed server system.

16. The method of claim 10, wherein the server is implemented as a stand-alone server.

17. The method of claim 10, and further comprising:
    associating ports in the LAN switch with at least one virtual LAN (VLAN) based on the configuration information.

18. A computer system comprising:
    a plurality of servers, each server including means for outputting server status information; and
    switching means for switching LAN signals, the switching means configured to be coupled to the means for outputting server status information of at least one of the servers and to a plurality of LANs, the switching means including means for connecting ports of the switching means based on received boot state information indicating a server boot state, thereby allowing server status information to be dynamically routed to different LANs.

19. The computer system of claim 18, wherein the means for outputting server status information includes means for outputting hardware status information to a first port of the switching means, and means for outputting operating system status information to a second port of the switching means.

20. The computer system of claim 19, wherein the means for outputting server status information includes means for outputting keyboard-video-mouse (KVM) data to a third port of the switching means.

21. The computer system of claim 18, and further comprising boot status means for generating boot state information indicating current server boot states of at least one of the servers.

22. The computer system of claim 18, wherein the first LAN is a management LAN that is accessible by authorized information technology (IT) users, and the second LAN is a combined payload and management LAN that is accessible by authorized application users.

23. The computer system of claim 18, wherein the switching means further comprises:
register means for indicating allowable connections between ports of the switching means, the register means programmable based on the received boot state information.

24. The computer system of claim 18, wherein the computer system is implemented as a bladed computer system.

25. The computer system of claim 18, wherein the computer system is implemented as a rack of stand-alone servers.

26. The computer system of claim 18, and further comprising means for configuring at least one virtual LAN (VLAN) in the switching means based on the received boot state information.

* * * * *